United States Patent
Fukuoka et al.

(10) Patent No.: US 7,489,344 B2
(45) Date of Patent: Feb. 10, 2009

(54) IMAGE RECORDER

(75) Inventors: Tomohiro Fukuoka, Kasugai (JP); Masaki Okada, Kasugai (JP); Kazuhiko Okada, Kasugai (JP); Hiromi Yokoi, Kasugai (JP); Nobuyuki Hattori, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 811 days.

(21) Appl. No.: 10/868,040

(22) Filed: Jun. 16, 2004

(65) Prior Publication Data

US 2005/0104979 A1 May 19, 2005

(30) Foreign Application Priority Data

Nov. 14, 2003 (JP) ............................. 2003-385561

(51) Int. Cl.
*H04N 5/228* (2006.01)
*H04N 5/225* (2006.01)
*H04N 5/76* (2006.01)

(52) U.S. Cl. ............................. 348/222.1; 348/207.99; 348/231.99

(58) Field of Classification Search .............. 348/222.1, 348/231.99
See application file for complete search history.

(56) References Cited

U.S. PATENT DOCUMENTS

| 5,412,427 | A * | 5/1995 | Rabbani et al. | 348/394.1 |
|---|---|---|---|---|
| 6,816,193 | B1 * | 11/2004 | Kohashi et al. | 348/234 |
| 7,266,151 | B2 * | 9/2007 | Acharya et al. | 375/240.16 |
| 2002/0191085 | A1* | 12/2002 | Jaspers | 348/223.1 |
| 2005/0122406 | A1* | 6/2005 | Voss et al. | 348/222.1 |

FOREIGN PATENT DOCUMENTS

JP         2000-196930         7/2000

* cited by examiner

*Primary Examiner*—David L Ometz
*Assistant Examiner*—Wanda M Negron
(74) *Attorney, Agent, or Firm*—Arent Fox LLP

(57) ABSTRACT

The present invention relates to an image recorder including a selector circuit. Image data output from the image recorder, or output data of an encoder, is format converted in a format conversion circuit, and provided to a selector circuit arranged in a stage either preceding or following a pre-process circuit. The selector circuit selects one of input data from a CCD and input data from the format conversion circuit and provides the selected input data to the pre-process circuit. The output data of the encoder is then fed back. This configures a pseudo imaging system.

19 Claims, 8 Drawing Sheets

Fig.2

| R | G | R | G | R | G | R | G | R | G |
|---|---|---|---|---|---|---|---|---|---|
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |

14

IMAGE RECORDER

CROSS-REFERENCE TO RELATED APPLICATIONS

This application is based upon and claims the benefit of priority from the prior Japanese Patent Application No. 2003-385561, filed on Nov. 14, 2003, the entire contents of which are incorporated herein by reference.

BACKGROUND OF THE INVENTION

The present invention relates to an image recorder for recording an image captured by an imaging device such as a digital video camera or a digital still camera.

Recently, digital cameras and digital video cameras are commonly used. With respect to mobile phones, those capable of taking a digital image, such as a still image or a moving image, and recording such images are widely used. It is desirable to develop a multifunctional product that efficiently carries out image processing of digital images at a low cost.

FIG. 1 shows a conventional color imaging system used in a imaging device such as a digital camera. The conventional imaging system is broadly divided into an analog front end (AFE) 10 and a digital back end (DBE) 20.

The analog front end 10, which is an analog circuit for processing an analog signal, includes an optical system circuit 11, for driving an optical system such as a lens and a diaphragm, and an imaging system circuit 12, having a CCD and a timing generator (TG) for operating the CCD. The imaging system circuit 12 performs A/D conversion on a charge (analog signal) accumulated in the CCD in accordance with a pulse signal provided from the timing generator to generate digital image data and provides the digital image data to the digital back end 20.

The digital back end 20 includes a memory controller 21, a pre-process circuit 22, a color processing circuit 23, a resolution conversion circuit 24, a JPEG compression-decompression circuit 25, an encoder 26 serving as an image output circuit, an interface circuit (I/F) 27, and a control unit (CPU) 28. A buffer memory 31, such as an SDRAM, is connected to the memory controller 21 in the digital back end 20. The memory controller 21 controls writing of the image data to the buffer memory 31 and reading of the image data from the buffer memory 31.

The analog front end 10 directly provides the image data to the pre-process circuit 22 in the digital back end 20. The pre-process circuit 22 performs pre-processes such as auto exposure (AE), auto focus (AF), and auto white balance (AWB) on the received image data. The image data pre-processed in the pre-process circuit 22 is temporarily stored in the buffer memory 31 by the memory controller 21. The pre-process circuit 22 extracts image quality control information regarding brightness and hue from the image data before being performed by the pre-process, and provides to the CPU 28 an evaluation value X1 corresponding to the image quality control information.

The color processing circuit 23 receives the image data pre-processed in the pre-process circuit 22 from the buffer memory 31, performs interpolation on the relevant image data, and generates image data in RGB format.

As shown in FIG. 2, a color filter 14 in the CCD of the analog front end 10 is a Bayer array type filter. The color filter 14 transmits only light of specific color components (red (R), green (G), or blue (B)) defined for each pixel of the CCD. A charge corresponding to the light of the specific color component transmitted through the color filter is accumulated in each of the light-receiving element (pixel) of the CCD. That is, the image data obtained from each element of the CCD is the data corresponding to one color component. Thus, in the interpolation performed in the color processing circuit 23, with respect to the image data of each element possessing only the information for one color component of RGB, image data (RGB format or YCbCr format) having information for three color components is generated by calculating a correction value for the information of three color components from the color component information of the neighboring image. The color processing circuit 23 stores such image data in the buffer memory 31.

The resolution conversion circuit 24 receives the image data from the buffer memory 31 and performs a resolution conversion process on the image data to enlarge or reduce the image.

A VRAM 31a for storing display data for an image that is displayed on a display device, such as a television (TV) or a liquid crystal display (LCD), is arranged as one part of a storage region of the buffer memory 31. The VRAM 31a stores, for example, the display data, on which resolution conversion for image display is performed in the resolution conversion circuit 24. The display data is sequentially transferred to the encoder 26 by the memory controller 21 and converted to a video output signal. The video output signal is then provided to the TV or the LCD, and an image corresponding to the signal is displayed on the display device.

The JPEG compression-decompression circuit 25 compresses (codes) or decompresses (decodes) the data of the still image in accordance with the JPEG standard. The data compressed in compliance with the JPEG standard in the JPEG compression-decompression circuit 25 is transferred and recorded to an external device (PC or MEDIA) via the I/F 27.

A flash memory 32 storing a control program is connected to the CPU 28. The CPU 28 controls the imaging system by executing the control program. The CPU 28 is connected to the pre-process circuit 22, the color processing circuit 23, the resolution conversion circuit 24, the JPEG compression-decompression circuit 25, the encoder 26, and the I/F 27 to provide a control signal to each circuit and control the operation of the circuit.

A software library 28a for AE process and AWB process is incorporated in the CPU 28. The CPU 28 provides a control value Y1, which corresponds to the evaluation value X1 from the pre-process circuit 22, to the pre-process circuit 22 and the color processing circuit 23 using the software library 28a. Thus, in the pre-process circuit 22 and the color processing circuit 23, correction control (feedback, control) is performed in accordance with the control value Y1 to achieve detailed image processing.

In recent years, an image capturing device such as a digital camera that can take both a still image and a moving image has been put into practical use. FIG. 3 shows a conventional imaging system used in an image capturing device for taking both still images and moving images. The imaging system is different from that of FIG. 1 in that an MPEG 4 compression-decompression circuit 29 is added in the digital back end 20. The MPEG 4 compression-decompression circuit 29 receives moving image data from the buffer memory 31 and compresses/decompresses (codes/decodes) the moving image data in accordance with the MPEG 4 standard. In the MPEG 4 compression-decompression circuit 29, the moving image data is compressed to generate stream data in compliance with the MPEG 4 standard. Further, the stream data is decompressed to generate the moving image data.

The stream data generated in the MPEG 4 compression-decompression circuit 29 is temporarily stored in the buffer memory 31, and subsequently, transferred to an external device (PC or MEDIA) via the I/F 27. Further, the stream data input from the external device is transferred via the I/F 27 and temporarily stored in the buffer memory 31. Subsequently, the stream data is received by the MPEG 4 compression-decompression circuit 29 and decompressed into moving image data.

Japan Laid-Open Patent Publication No. 2000-196930 discloses a conventional recorder for recording an image taken with a digital camera.

In the prior art, there are no imaging systems having a circuit configuration in which image data is fed back to a stage preceding or following the pre-process circuit 22 in the data processing path.

SUMMARY OF THE INVENTION

One aspect of the present invention is an image recorder for recording input image data provided from an imaging device and displaying an image on a display device based on the image data. The image recorder includes a buffer memory. A pre-process circuit transfers input image data provided from the imaging device to the buffer memory and detects control information from the input image data. An image processing circuit receives the image data from the buffer memory, performs image processing on the image data, and generates processed image data. An image output circuit outputs output data to display an image on the display device based on the processed image data. A format conversion circuit converts a format of the output data and generates format converted data having a format that is the same as that of the input image data. A selector circuit receives the input image data and the format converted data, selects one of the input image data and the format converted data, and provides the selected data to the pre-process circuit.

Another aspect of the present invention is an image recorder including a compression-decompression circuit for compressing and decompressing image data, for recording compressed image data compressed in the compression-decompression circuit to an external device. The image recorder includes a pre-process circuit for transferring input image data provided from an imaging device to a buffer memory and detects control information from the input image data. An image processing circuit receives the image data from the buffer memory and performs image processing on the image data to generate processed image data. An image output circuit outputs output data to display an image on the display device based on the processed image data. A selector circuit receives the image data output from the pre-process circuit and the image data output from the compression-decompression circuit and selectively provides one of the two image data to the buffer memory. The compression-decompression circuit compresses the image data transmitted from the buffer memory to the image output circuit and provides decompressed image data to the selector circuit.

A further aspect of the present invention is an image recorder including a compression-decompression circuit for compressing and decompressing image data, for recording compressed image data compressed in the compression-decompression circuit to an external device. The image recorder includes a pre-process circuit for transferring input image data provided from an imaging device to a buffer memory and detects control information from the input image data. An image processing circuit receives the image data from the buffer memory and performs image processing on the image data to generate processed image data. An image output circuit outputs output data to display an image on a display device based on the processed image data. A selector circuit receives the input image data and image data output from the compression-decompression circuit and selectively provides one of the two image data to the pre-process circuit. The compression-decompression circuit compresses the image data transmitted to the image output circuit and provides decompressed image data to the selector circuit.

A further aspect of the present invention is a digital back end for receiving original data of an image from an analog front end including an imaging device, outputting output data to display the image on a display device, and recording the image in an external device in a format differing from that of the original data. The digital back end includes a format conversion circuit for format converting the output data to format converted data having a format that is the same as that of the original data. A pre-process circuit performs a pre-process on the image data and generates pre-processed data. A feedback path feeds back the format converted data to a stage preceding or following the pre-process circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a diagram illustrating the configuration of a color filter;

DETAILED DESCRIPTION OF THE PREFERRED EMBODIMENTS

An image recorder according to a first embodiment of the present invention will now be described with reference to the drawings.

Figure 1:
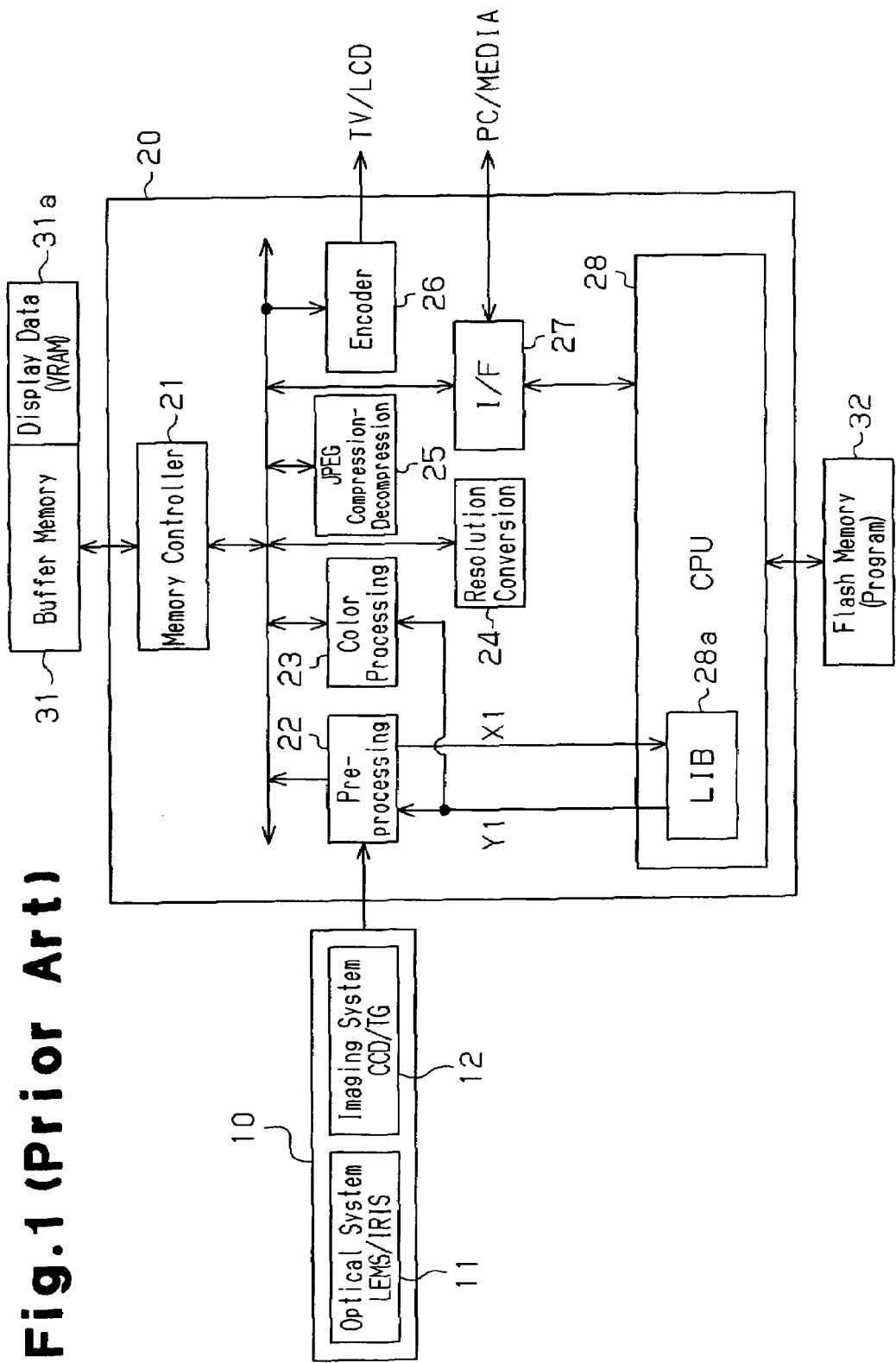
FIG. 1 is a block circuit diagram of a first prior art example.
Figure 4:
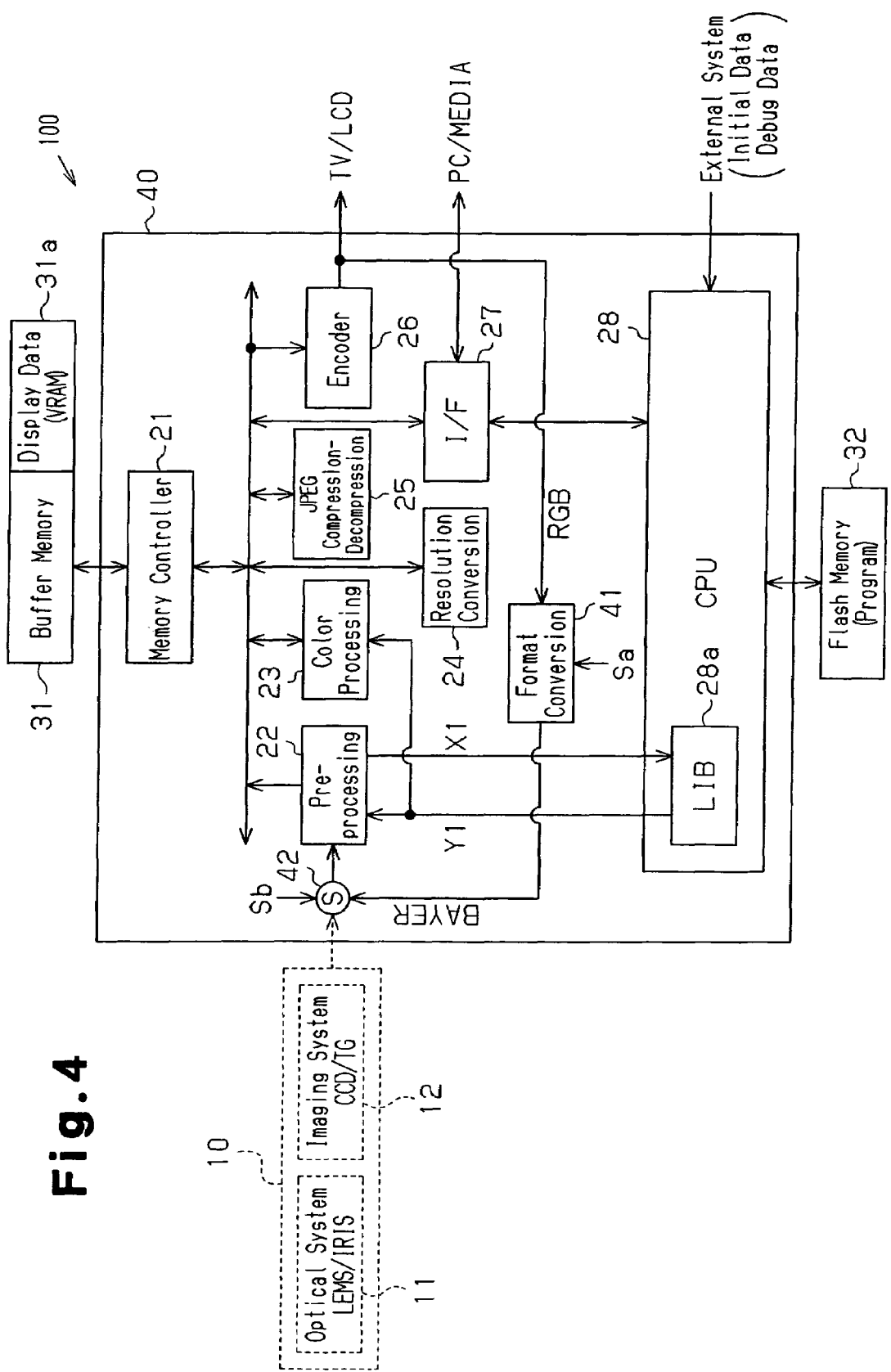
FIG. 4 is a block circuit diagram showing an image recorder according to a first embodiment of the present invention.

As shown in FIG. 4, an image recorder 100 of the first embodiment includes a digital back end 40, a buffer memory 31, and a flash memory 32. The buffer memory 31 and the flash memory 32 are detachably connected to the digital back end 40. The digital back end 40 is different from the conventional digital back end 20 shown in FIG. 1 in that a format conversion circuit 41 and a selector circuit 42 are added. The digital back end 40 includes an input terminal connectable to an output terminal of the analog front end 10. When the digital back end 40 is not connected to the analog front end 10, the digital back end 40 configures a pseudo imaging system.

The following description focuses on the differences with the conventional imaging system.

The format conversion circuit 41 format-converts a signal of each RGB color generated by the encoder 26 and generates image data having a Bayer array format.

Figure 5:
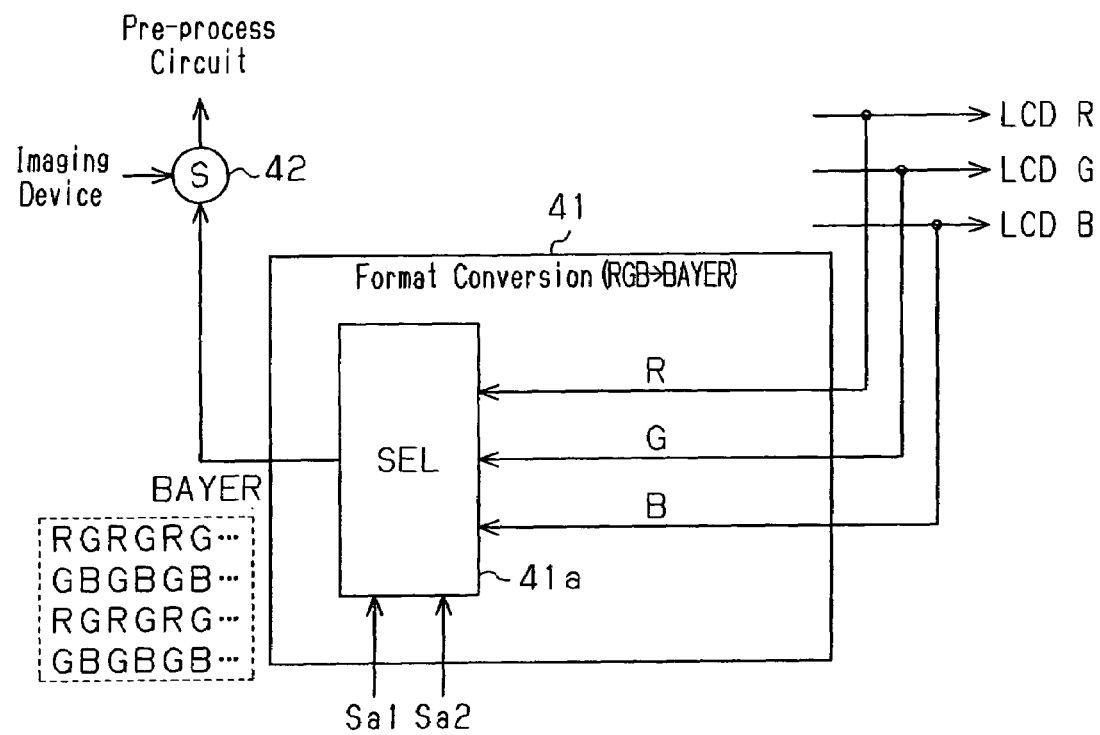
FIG. 5 is a block circuit diagram showing a format conversion circuit.

As shown in FIG. 5, the format conversion circuit 41 includes a selector circuit (SEL) 41a. The signal corresponding to each color (RGB) output from the encoder 26 is provided to the selector circuit 41a. The selector circuit 41a selects and outputs one of the signals corresponding to each color in accordance with a select signal Sa (Sa1, Sa2). A signal (image data) corresponding to each color is provided to the selector circuit 42 in the order corresponding to the Bayer array in the same manner as the image data (original data) provided from the imaging device (CCD).

As shown in FIG. 4, the selector circuit 42 selects either the image data from the format conversion circuit 41 or the input data from the CCD of the analog front end 10 in accordance with a select signal Sb. The selected data is provided to the pre-process circuit 22. More specifically, when the analog front end 10 is connected to the digital back end 40 to configure an imaging system (normal mode), the selector circuit 42 selects the input data from the CCD in accordance with the select signal Sb and provides the input data to the pre-process circuit 22. When the digital back end 40 configures a pseudo imaging system without connecting to the analog front end 10 (debug mode), the selector circuit 42 selects the image data from the format conversion circuit 41 in accordance with the select signal Sb and provides the image data to the pre-process circuit 22.

If the control unit (CPU) 28 is connected to an external system (debug tool), the CPU 28 receives initial data and debug data from the external system and transfers the data to the buffer memory 31. With such configuration, the Bayer array image data is provided to the pre-process circuit 22 even if the analog front end 10 is not connected. The pre-process circuit 22, the color processing circuit 23, the resolution conversion circuit 24, and the JPEG compression-decompression circuit 25 respectively perform processes to generate the display data and to generate the image data complying with the JPEG standard. That is, each type of process is performed on the image data in the data processing path in the same manner as when the analog front end 10 is connected. This enables checking of the operation of the relevant data processing path and the software library 28a in the CPU 28.

Each of the circuits 21 to 28, 41, and 42 of the digital back end 40 are configured on a semiconductor integrated circuit (LSI) of a single chip. The color processing circuit 23, the resolution conversion circuit 24, and the JPEG compression-decompression circuit 25 configure an image processing circuit.

The operation of the pseudo imaging system will now be explained.

First, the CPU 28 receives the initial data from the external system, and stores the data in the VRAM 31a of the buffer memory 31 as the display data. The display data stored in the VRAM 31a of the buffer memory 31 is sequentially transferred to the encoder 26 by the memory controller 21. The encoder 26 converts the display data to an RGB video signal and outputs the video signal. The output signal of the encoder 26 is provided to a display device (TV or LCD), and an image corresponding to the output signal is displayed on the display device. The output signal of the encoder 26 is also provided to the format conversion circuit 41 and format converted to the Bayer array image data. The format converted image data is provided from the format conversion circuit 41 to the selector circuit 42. In the selector circuit 42, the image data from the format conversion circuit 41 is selected in accordance with the select signal Sb and provided to the pre-process circuit 22.

The pre-process circuit 22 performs the pre-processes of auto exposure (AE), auto focus (AF) and auto white balance (AWB) on the received image data. The pre-processed image data is then temporarily stored in the buffer memory 31. The pre-process circuit 22 also detects control information regarding brightness and hue from the received image data, generates an evaluation value X1 corresponding to the information, and transmits the evaluation value X1 to the CPU 28.

The color processing circuit 23 receives the image data from the buffer memory 31 and performs interpolation on the received data. The interpolation generates image data complying with the RGB format. The image data is stored in the VRAM 31a of the buffer memory 31 as the display data. The display data is sequentially transferred to the encoder 26 and converted to a video output signal. The image corresponding to the output signal of the encoder 26 is displayed on the display device.

The data output from the encoder 26 is fed back to the pre-process circuit 22 in the data processing path via the format conversion circuit 41 and the selector circuit 42, and is used for a feedback process in the pre-process circuit 22 and the color processing circuit 23. In other words, the digital back end 40 includes a feedback path including the encoder 26, the format conversion circuit 41, and the selector circuit 42.

The CPU 28 provides a control value Y1, corresponding to the evaluation value X1 from the pre-process circuit 22, to the pre-process circuit 22 and the color processing circuit 23 using the software library 28a. The pre-process circuit 22 and the color processing circuit 23 perform correction control (feedback control) in accordance with the control value Y1.

The first preferred embodiment of the present invention has the following advantages.

(1) A novel circuit configuration is employed, in which the selector circuit 42 is arranged in a stage preceding the pre-process circuit 22 included in the data processing path, and the image data format converted to the Bayer array image data in the format conversion circuit 41 is fed back via the selector circuit 42. This configures a pseudo imaging system. Further, in the digital back end 40, proper functioning of the software library 28a and proper operation of the data processing path of the image data are checked. That is, even if the analog front end 10, which configures the imaging system, is not prepared in the development phase of the imaging system, the operation of the digital back end 20 may be checked. This improves the development efficiency of the system.

An image recorder 200 according to a second embodiment of the present invention will now be described.

Figure 3:
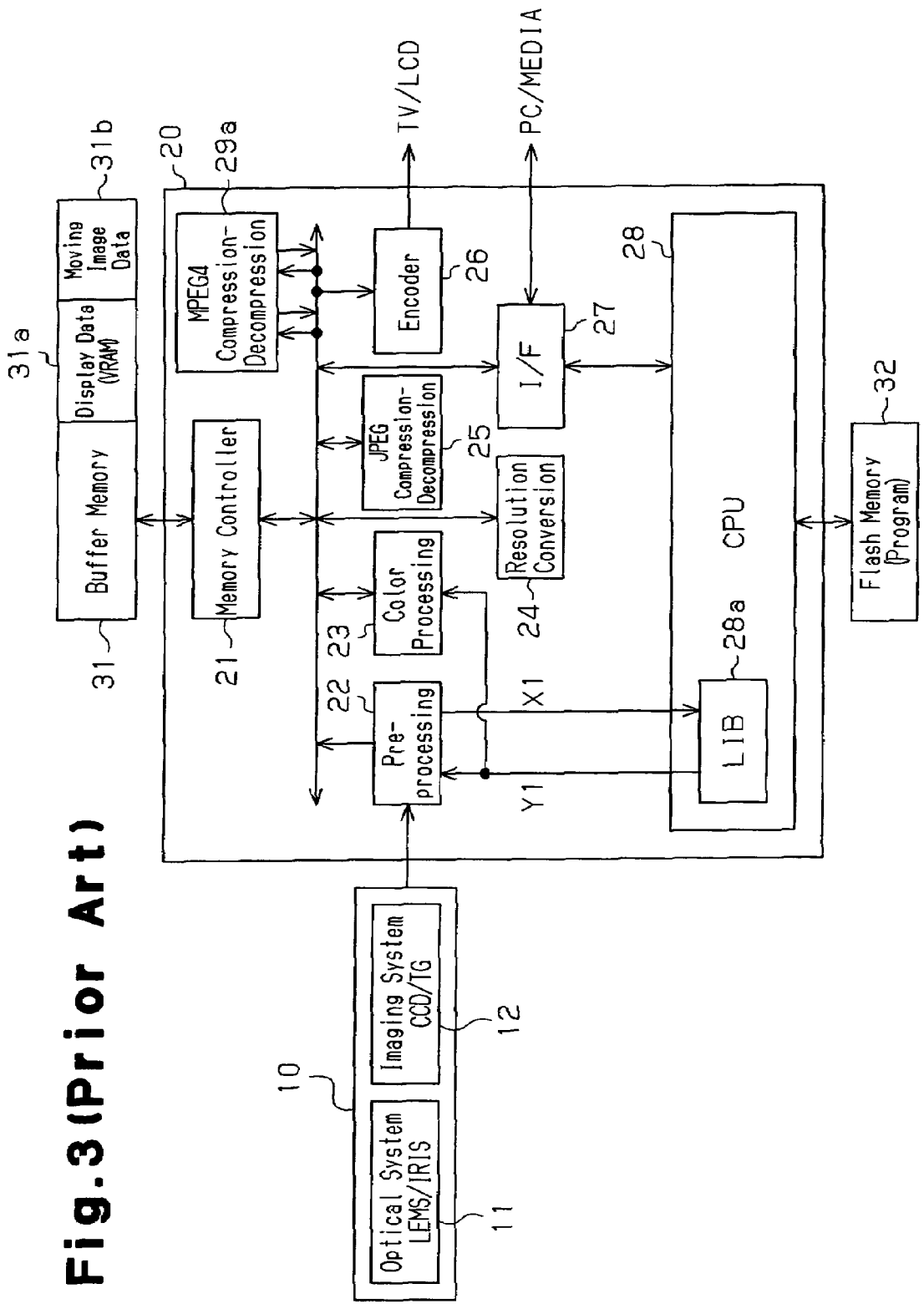
FIG. 3 is a block circuit diagram showing a second prior art example.
Figure 6:
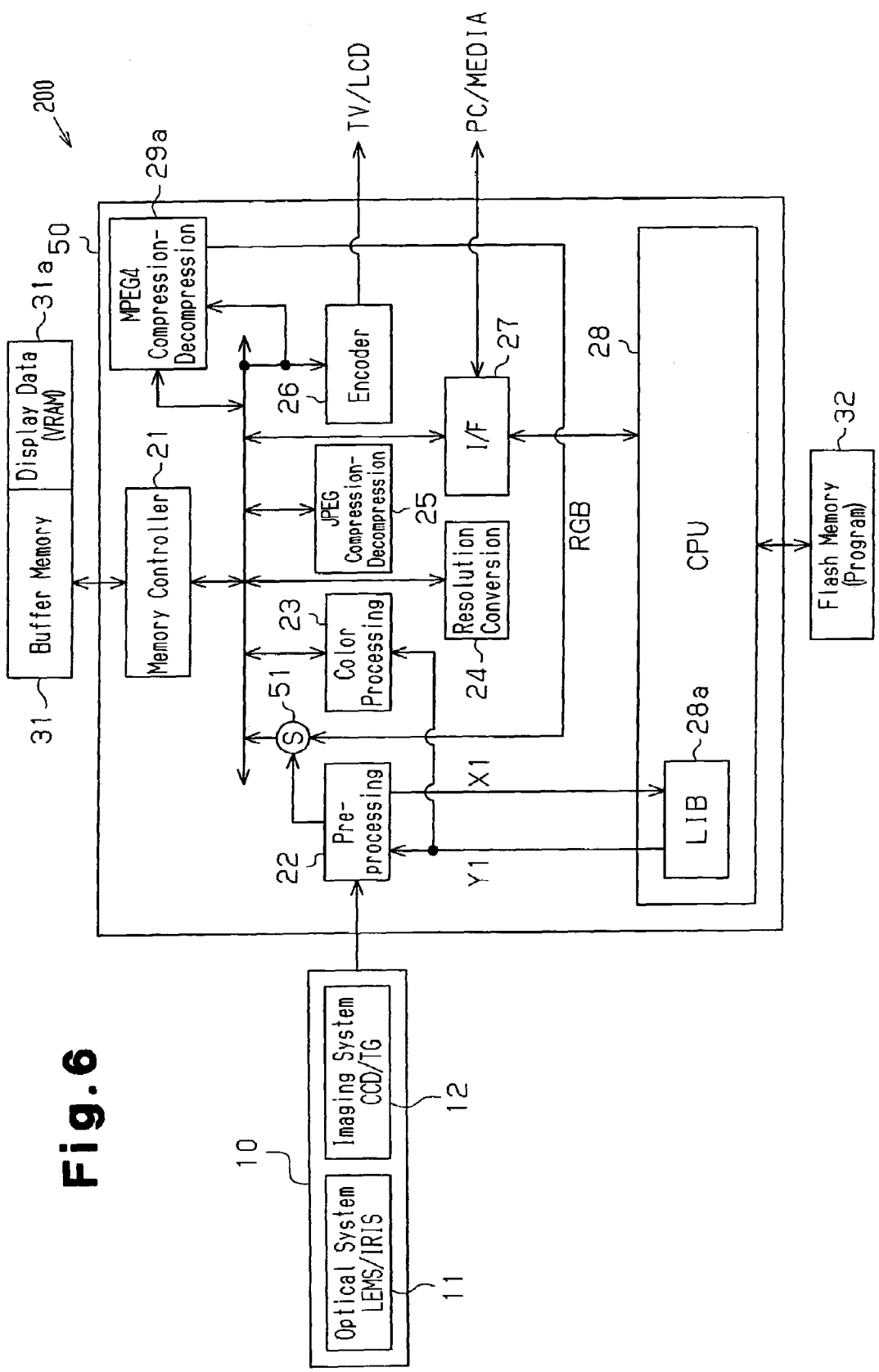
FIG. 6 is a block circuit diagram showing an image recorder according to a second embodiment of the present invention.

As shown in FIG. 6, the digital back end 50 of the image recorder 200 of the second embodiment differs from the conventional digital back end 20 shown in FIG. 3 in that a selector circuit 51 is added and in the wiring for data input/output of the MPEG 4 compression-decompression circuit 29a.

In the digital back end 50, the selector circuit 51 is arranged in a stage following the pre-process circuit 22. Output data for the pre-process circuit 22 and output data for the MPEG 4 compression-decompression circuit 29a are provided to the selector circuit 51. The selector circuit 51 selects either the output data of the pre-process circuit 22 or the output data of the MPEG 4 compression-decompression circuit 29a in accordance with the select signal (not shown) and provides the selected output data to the buffer memory 31. More specifically, when recording a moving image, the selector circuit 51 selects and provides the image data from the pre-process circuit 22 to the buffer memory 31. When reproducing the moving image, the selector circuit 51 selects and provides the data from the MPEG 4 compression-decompression circuit 29a to the buffer memory 31. The digital back end 50 thus includes a feedback path including the MPEG 4 compression-decompression circuit 29a and the selector circuit 51.

The operation for recording the moving image will now be explained.

The image data (original data) output from the analog front end 10 is provided to the pre-process circuit 22 in the digital back end 50. The pre-process circuit 22 performs the pre-processes of auto exposure (AE), auto focus (AF), and auto white balance (AWB) on the original data. The pre-processed data is temporarily stored in the buffer memory 31 via the selector circuit 51. The color processing circuit 23 receives the pre-processed data from the buffer memory 31, performs interpolation on the received data, and generates display data complying with the RGB format. The display data is then stored in the VRAM 31a of the buffer memory 31. The display data is sequentially transferred from the VRAM 31a to the encoder 26 and converted to a video output signal. The image corresponding to the output signal of the encoder 26 is displayed on the display device.

The MPEG 4 compression-decompression circuit 29a receives the display data transferred from the VRAM 31a to the encoder 26, compresses the display data, and encodes the display data to stream data complying with the MPEG 4 standard. In the MPEG 4 compression-decompression circuit 29a, the data subject of encoding (moving image) is converted to the same format as the display data. Thus, the display data is treated as the dynamic data. The stream data of the moving image encoded in the MPEG 4 compression-decompression circuit 29a is temporarily stored in the buffer memory 31, and subsequently, transferred and recorded to an external device, such as a personal computer (PC) or a recording media (MEIDA), via the I/F 27.

The operation of reproducing the moving image will now be explained.

The stream data of the moving image input from the external device (PC or MEDIA) is transferred to the buffer memory 31 via the I/F 27. The MPEG 4 compression-decompression circuit 29a receives the stream data from the buffer memory 31, decodes the stream data to display data, and provides the display data to the selector circuit 51. The selector circuit 51 selects and outputs the display data decoded in the MPEG 4 compression-decompression circuit 29a. Then, the display data is stored in the VRAM 31a of the buffer memory by the memory controller 21. The display data is then sequentially transferred from the VRAM 31a to the encoder 26, and the image corresponding to the output signal of the encoder 26 is displayed on the display device. Then, the data decoded in the MPEG 4 compression-decompression circuit 29a is sequentially transferred to the VRAM 31a of the buffer memory 31 via the selector circuit 51 to update the display data of the VRAM 31a. The transfer of the display data to the encoder 26 displays the moving image on the display device.

The second embodiment has the following advantages.

(1) The MPEG 4 compression-decompression circuit 29a encodes the display data transferred from the VRAM 31a to the encoder 26 and generates stream data for the moving image. The selector circuit 51 is arranged in a stage following the pre-process circuit 22 included in the data processing path. A novel circuit configuration is configured in which the display data decoded in the MPEG 4 compression-decompression circuit 29a is fed back. In this case, the display data input to the encoder 26 for displaying the image on the display device and the dynamic data for data recording processed in the MPEG 4 compression-decompression circuit 29a are of the same format and are used as common data. That is, by receiving the display data from the VRAM 31a in the buffer memory 31 once, output to the display device and encoding in the MPEG 4 compression-decompression circuit 29a are carried out using the same display data. This reduces the bus band occupied for the data input to and output from the buffer memory 31. Further, compared to a conventional circuit, the path (signal line configuration) for carrying out data input/output is simplified.

In contrast, the conventional imaging system shown in FIG. 3, the display data and the moving image data are separately generated. The display data is stored in the VRAM 31a of the buffer memory. The moving image data is stored in a storage region 31b, which differs from the VRAM 31a in the buffer memory 31. Therefore, the storage capacity required for the buffer memory 31 is relatively large. In this system, the display data and the moving image data are separately received and processed. This occupies a large portion of the bus band. Further, a plurality of exclusive lines for input/output of stream data and input/output of moving image data are required. Thus, the circuit configuration is complicated.

(2) The display data is encoded in the MPEG 4 compression-decompression circuit 29a. This ensures the recording of the image data (display data) corresponding to the moving image displayed on the display device. Thus, the moving image output to the display device always matches the recorded moving image.

(3) There is no need to separately store the display data and the moving image data. This reduces the storage capacity of the buffer memory 31. Thus, a compact image capturing device is obtained at a low cost.

An image recorder 300 according to a third embodiment of the present invention will now be explained focusing on the differences with the digital back end 40 according to the first embodiment shown in FIG. 4.

Figure 7:
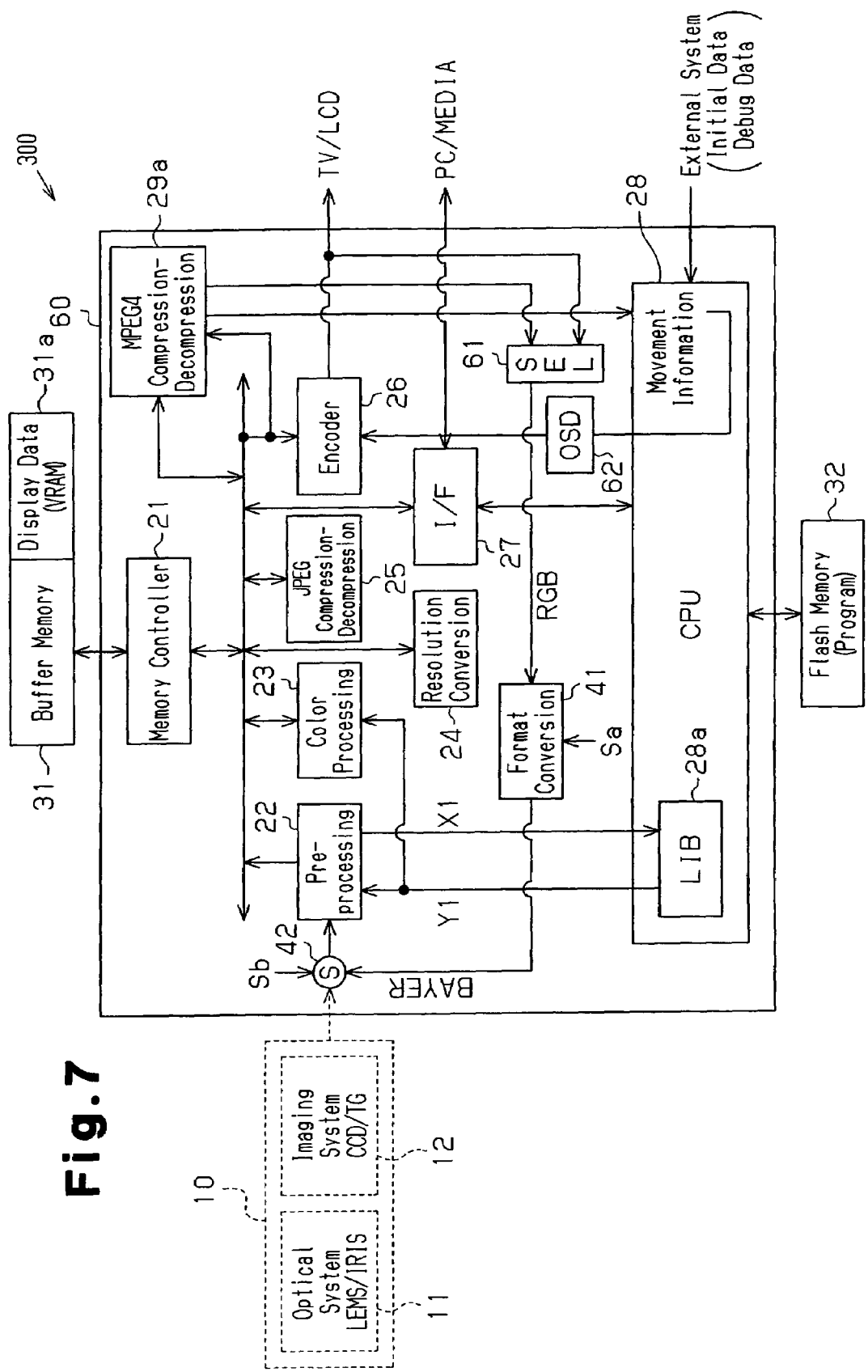
FIG. 7 is a block circuit diagram showing an image recorder according to a third embodiment of the present invention.

As shown in FIG. 7, the digital back end 60 includes an MPEG 4 compression-decompression circuit 29b, a selector circuit (SEL) 61, and an OSD processing circuit 62. A pseudo imaging system is configured with the digital back end 60 without connecting to the analog front end 10.

The MPEG 4 compression-decompression circuit 29b receives the display data to be transferred from the VRAM 31a to the encoder 26 and compresses the display data to encode the data to stream data complying with the MPEG 4 standard. In the MPEG 4 compression-decompression circuit 29b, the data subject of encoding (moving image data) is converted to the same format as the display data. The stream data for the moving image encoded in the MPEG 4 compression-decompression circuit 29b is temporarily stored in the buffer memory 31 and then transferred and recorded to an external device (PC or MEDIA) via the I/F 27.

When reproducing the moving image, the stream data of the moving image input from the external device (PC or MEDIA) is transferred to the buffer memory 31 via the I/F 27. The MPEG 4 compression-decompression circuit 29b receives the stream data from the buffer memory 31, decodes the display data, and provides the data to the selector circuit 61.

The output data for the MPEG 4 compression-decompression circuit 29b and the output data for the encoder 26 are provided to the selector circuit 61. The selector circuit 61 selects one of the two output data in accordance with a select signal (not shown) and provides the selected data to the format conversion circuit 41.

When the output data from the encoder 26 is input from the selector circuit 61, the format conversion circuit 41 format converts the output data of the encoder 26 (e.g., each output signal for RGB) to the Bayer array image data and provides the data to the selector circuit 42. When the output data of the MPEG 4 compression-decompression circuit 29b is input from the selector circuit 61, the format conversion circuit 41 provides the data to the selector circuit 42 without performing format conversion on the data.

The selector circuit 42 provides either the image data from the format conversion circuit 41 or the image data from the CCD of the analog front end 10 to the pre-process circuit 22 in accordance with the select signal Sb.

The OSD processing circuit 62, in accordance with the control signal provided from the CPU 28, generates display data for displaying characters indicating the time of day and a battery mark indicating the state of the battery on the screen of the display device. The OSD processing circuit 62 further generates display data for displaying a movement mark that tracks the imaging subject and transfers the display data to the encoder 26. The encoder 26 displays the time and day, the battery mark, and the movement mark on the screen of the display device in accordance with the display signal.

The operation of the imaging system according to the third embodiment of the present invention will now be explained.

First, operation of the pseudo imaging system in a state in which the analog front end 10 is not connected will be explained (operation in debug mode).

The CPU 28 receives the initial data from the external system and stores the initial data in the VRAM 31a of the buffer memory 31 as display data. The display data stored in the VRAM 31a is sequentially transferred to the encoder 26 by the memory controller 21, converted to an RGB video signal corresponding to the display data, and output from the encoder 26. The image corresponding to the output signal of the encoder 26 is displayed on the display device.

The selector circuit 61 selects the output signal of the encoder 26 and provides the output signal to the format conversion circuit 41. The format conversion circuit 41 format converts the output signal of the encoder 26 to Bayer array format image data and provides the converted image data to the selector circuit 42. The selector circuit 42 selects the format converted image data and provides the image data to the pre-process circuit 22.

The pre-process circuit 22 performs the pre-processes of auto exposure (AE), auto focus (AF), and auto white balance (AWB) on the input image data and temporarily stores the pre-processed image data in the buffer memory 31. The pre-process circuit 22 detects the control information regarding brightness and hue from the input image data and provides to the CPU 28 the evaluation value X1 corresponding to the information.

The color processing circuit 23 receives the image data from the buffer memory 31, performs interpolation on the data, generates display data complying with the RGB format, and stores the display data in the VRAM 31a of the buffer memory 31. The display data is sequentially transferred from the VRAM 31a to the encoder 26, and the image corresponding to the output data of the encoder 26 is displayed on the display device.

In this manner, the data output from the encoder 26 is fed back to the pre-process circuit 22 included in the data processing path via the selector circuit 61, the format conversion circuit 41, and the selector circuit 42. The pre-process circuit 22 and the color processing circuit 23 then perform respective processes. In other words, the digital back end 60 includes a feedback path configured by the encoder 26, the MPEG 4 compression-decompression circuit 29b, the selector circuit 61, the format conversion circuit 41, and the selector circuit 42.

The CPU 28 provides a control value Y1, corresponding to the evaluation value X1 from the pre-process circuit 22, to the pre-process circuit 22 and the color processing circuit 23 using the software library 28a. Thus, in the pre-process circuit 22 and the color processing circuit 23, correction control (feedback control) is performed in accordance with the control value Y1.

In the third embodiment, in the same manner as the first embodiment, a pseudo imaging system is configured without connecting the analog front end 10 to the digital back end 60. In this case, proper functioning of the software library 28a and proper operation of the data processing path of the image data in the digital back end 60 are checked.

In the imaging system of the third embodiment, the operation of the digital back end 60 is checked using the stream data for the moving image input from the external device (PC or MEDIA). The operation check is carried out using the moving image reproducing function.

When performing the operation check, the stream data that is to be evaluated is first transferred from an external device to the buffer memory 31 via the I/F 27. The MPEG 4 compression-decompression circuit 29b receives the stream data from the buffer memory 31, decodes the stream data to the display data (image data), and provides the display data to the selector circuit 61.

The selector circuit 61 selects the display data from the MPEG 4 compression-decompression circuit 29b and provides the display data to the format conversion circuit 41. The format conversion circuit 41 provides the display data to the selector circuit 42 without performing the format conversion. The selector circuit 42 selects the display data from the format conversion circuit 41 in accordance with the select signal Sb and provides the display data to the pre-process circuit 22.

The pre-process circuit 22 stores the display data in the VRAM 31a without performing the pre-process. The display data is sequentially transferred from the VRAM 31a to the encoder 26, and the image corresponding to the output signal of the encoder 26 is displayed on the display device.

The output signal of the encoder 26 is then fed back to the pre-process circuit 22 via the selector circuit 61, the format conversion circuit 41, and the selector circuit 42. The operation check of the digital back end 60 is carried out in this manner.

When encoding the display data transferred from the VRAM 31a to the stream data of the moving image, the MPEG 4 compression-decompression circuit 29b detects the movement vector (movement information) from each frame of the moving image to encode the error data between each frame in accordance with the movement information. At the same time, the MPEG 4 compression-decompression circuit 29b sends the movement information to the CPU 28. The CPU 28 provides a control signal corresponding to the movement information to the OSD processing circuit 62. The OSD processing circuit 62 performs a process to display the movement mark in accordance with the control signal.

More specifically, when, for example, the user operates an operating part (not shown) so that the movement mark overlaps a tracking subject (imaging subject) in a screen of the display device. The user then switches a start button for the tracking mode to ON. The CPU 28 responds to the activation of the start button, recognizes the initial position of the movement mark (imaging subject) in the screen of the display device, and provides a corresponding signal to the OSD processing circuit 62. If the imaging subject moves after the setting, the CPU 28 acquires the movement information corresponding to the movement of the subject from the MPEG 4 compression-decompression circuit 29*b* and provides the control signal to the OSD processing circuit 62. The OSD processing circuit 62 generates the display data in accordance with the control signal and provides the display data to the encoder 26. The encoder 26 displays the movement mark on the screen of the display device to track the moving subject.

The third embodiment has the following advantages.

(1) In the digital back end 60 capable of recording the moving image, a pseudo imaging system is configured. Thus, even if the analog front end 10 is not prepared in the development phase of the imaging system, the operation check of the digital back end 60 is performed. This improves the development efficiency of the system.

(2) The imaging system of the third embodiment commonly uses the display data for outputting the image to the display device and the moving image. This reduces the occupied bus band.

(3) The movement mark tracking the imaging subject is displayed on the screen of the display device. Thus, the user may easily adjust the orientation of the camera to position the subject in the center of the screen by checking the movement mark.

The above mentioned embodiments may be modified in the following ways.

Figure 8:
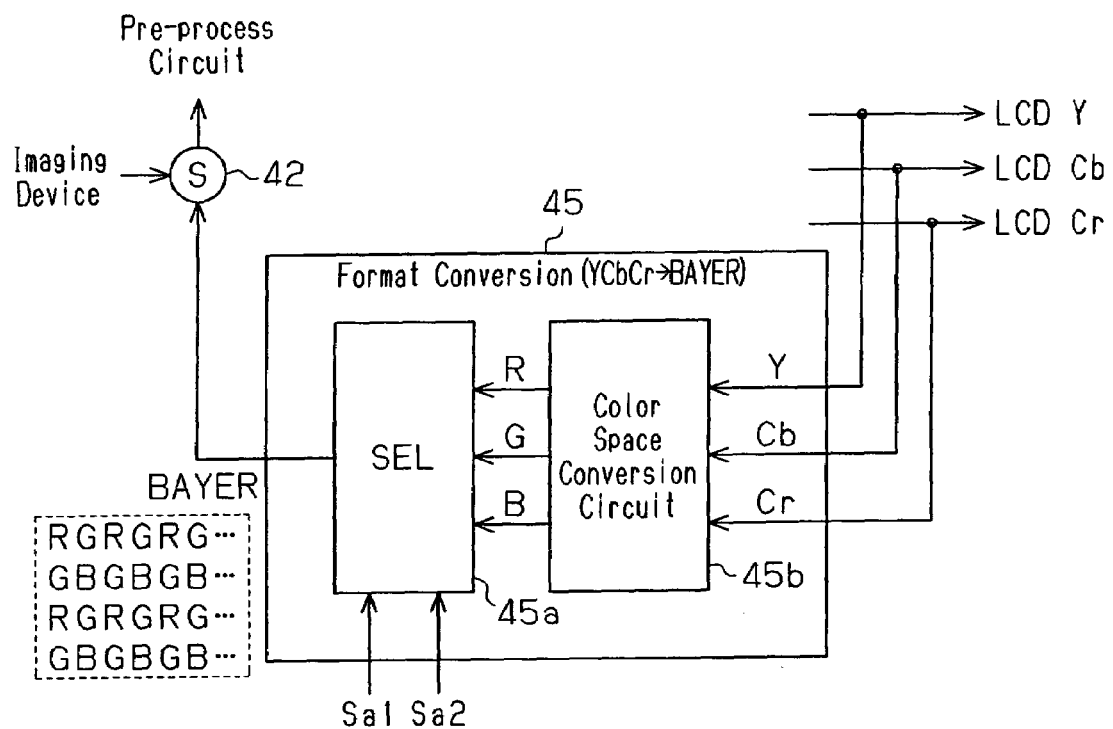
FIG. 8 is a block circuit diagram showing another example of the format conversion circuit.

The format conversion circuit 41 in the first embodiment is a circuit for format converting the output signal of three primary colors of RGB output from the encoder 26 to Bayer array image data. However, the circuit configuration may be changed if necessary in accordance with the output signal of the encoder 26. For example, when the LCD outputs an image based on the output signal for luminance color difference space (YCbCr) output from the encoder 26, the format conversion circuit 45 shown in FIG. 8 is used. The format conversion circuit 45 includes a selector circuit (SEL) 45*a* and a color space conversion circuit 45*b*. A signal corresponding to each color (YCbCr) of the encoder 26 is input to the color space conversion circuit 45*b*. The color space conversion circuit 45*b* performs a color space conversion process, and the signal (image data) converted to each color of RGB from YCbCr is provided to the selector circuit 45*a*. The selector circuit 45*a* selects one of the signals corresponding to each color in accordance with the select signal Sa (Sa1, Sa2) so that a signal corresponding to each color is output in the order corresponding to the Bayer array. Thus, image data having the same format as the format of the image data (Bayer array) input from the imaging device (CCD) is provided to the selector circuit 42.

In the imaging system of the third embodiment, the CPU 28 may perform a vibration reduction process, or an unintentional hand movement cancellation process based on the movement information (movement vector) acquired from the MPEG 4 compression-decompression circuit 29*b*. More specifically, the system may be configured so that the CPU 28 notifies the pre-process circuit 22 of the control signal corresponding to the movement information. In this case, the pre-process circuit 22, with respect to each image data input from the imaging device (CCD), changes the receiving position of such image data based on the control signal. Further, the control signal corresponding to the movement information may provide notification from the CPU 28 to the color processing circuit 23 and the resolution conversion circuit 24. In this case, the image data is trimmed based on the movement information and then processed in the color processing circuit 23 and the resolution conversion circuit 24. That is, each image process is performed so as to cancel the unintentional hand movement by trimming the image data in accordance with the movement information. A sharp image is recorded as a result of the cancellation process.

In each of the above embodiments, the imaging system includes the analog front end 10 and the digital back end 40. However, the present invention is not limited to such configurations. For example, an imaging system may include a digital front end between an analog front end and a digital back end.

In each embodiment, devices other than a CCD such as CMOS may also be used as an imaging device for the analog front end 10.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An image recorder for recording input image data provided from an imaging device and displaying an image on a display device based on the image data, the image recorder comprising:
    a pre-process circuit for transferring input image data provided from the imaging device to a buffer memory and detecting control information from the input image data;
    an image processing circuit for receiving the input image data from the buffer memory, performing image processing on the input image data, and generating processed image data;
    an image output circuit for outputting output data to display an image on the display device based on the processed image data;
    a format conversion circuit for converting a format of the output data and generating format converted data having a format that is the same as that of the input image data; and
    a selector circuit for receiving the input image data and the format converted data, selecting one of the input image data and the format converted data, and providing the selected data to the pre-process circuit.

2. The image recorder according to claim 1, wherein the input image data is in a format corresponding to a Bayer array, the output data includes three signals, each corresponding to one of three primary colors, and the format conversion circuit outputs the three signals in accordance with a select signal in the order corresponding to the Bayer array.

3. The image recorder according to claim 1, wherein the format conversion circuit converts data representing a luminance color difference space to data representing the three primary colors.

4. An image recorder including a compression-decompression circuit for compressing and decompressing image data, for recording compressed image data compressed in the compression-decompression circuit to an external device, the image recorder comprising:
    a pre-process circuit for transferring input image data provided from an imaging device to a buffer memory and detecting control information from the input image data;
    an image processing circuit for receiving the input image data from the buffer memory and performing image processing on the input image data to generate processed image data;
    an image output circuit for outputting output data to display an image on a display device based on the processed image data; and
    a selector circuit for receiving the image data output from the pre-process circuit and the image data output from the compression-decompression circuit and for selectively providing one of the two image data to the buffer memory, wherein the compression-decompression circuit compresses the image data transmitted from the buffer memory to the image output circuit and provides decompressed image data to the selector circuit.

5. The image recorder according to claim 4, further comprising:
a control unit for controlling the image processing circuit, wherein the compression-decompression circuit detects movement information from image data of an input moving image and provides the movement information to the control unit.

6. The image recorder according to claim 5, wherein the control unit performs a process for tracking an imaging subject based on the movement information.

7. The image recorder according to claim 5, wherein the control unit performs a vibration reduction process on the moving image based on the movement information.

8. The image recorder according to claim 4, wherein the input data is in a format corresponding to a Bayer array, the output data includes three signals, each corresponding to one of three primary colors, and the compression-decompression circuit outputs the three signals in accordance with a select signal in the order corresponding to the Bayer array.

9. The image recorder according to claim 8, wherein the compression-decompression circuit converts data representing a luminance color difference space to data representing the three primary colors.

10. An image recorder including a compression-decompression circuit for compressing and decompressing image data, for recording compressed image data compressed in the compression-decompression circuit to an external device, the image recorder comprising:
a pre-process circuit for transferring input image data provided from an imaging device to a buffer memory and detecting control information from the input image data;
an image processing circuit for receiving the input image data from the buffer memory and performing image processing on the input image data to generate processed image data;
an image output circuit for outputting output data to display an image on a display device based on the processed image data; and
a selector circuit for receiving the input image data and image data output from the compression-decompression circuit and selectively providing one of the two image data to the pre-process circuit, wherein the compression-decompression circuit compresses the image data transmitted to the image output circuit and provides decompressed image data to the selector circuit.

11. The image recorder according to claim 10, further comprising:
a format conversion circuit, connected between the image output circuit and the selector circuit, for converting the output data of the image output circuit to format converted data, having a format that is the same as that of the input data, and providing the format converted data to the selector circuit, the selector circuit providing one of the format converted data and the input image data to the pre-process circuit.

12. The image recorder according to claim 11, further comprising a second selector circuit, connected to the format conversion circuit, the image output circuit, and the compression-decompression circuit, for selecting one of the output data of the image output circuit and the image data output from the compression-decompression circuit and providing the selected data to the format conversion circuit.

13. The image recorder according to claim 10, further comprising:
a control unit for controlling the image processing circuit, wherein the compression-decompression circuit detects movement information from image data of an input moving image and provides the movement information to the control unit.

14. The image recorder according to claim 13, wherein the control unit performs a process for tracking an imaging subject based on the movement information.

15. The image recorder according to claim 13, wherein the control unit performs a vibration reduction process on the moving image based on the movement information.

16. The image recorder according to claim 11, wherein the input data is in a format corresponding to a Bayer array, the output data includes three signals, each corresponding to one of three primary colors, and the format conversion circuit outputs the three signals in accordance with a select signal in the order corresponding to the Bayer array.

17. The image recorder according to claim 11, wherein the format conversion circuit converts data representing a luminance color difference space to data representing the three primary colors.

18. A digital back end for receiving original data of an image from an analog front end including an imaging device, outputting output data to display the image on a display device, and recording the image in an external device in a format differing from that of the original data, the digital back end comprising:
a format conversion circuit for format converting the output data to format converted data having a format that is the same as that of the original data;
a pre-process circuit for performing a pre-process on the original data and generating pre-processed data; and
a feedback path for feeding back the format converted data to a stage preceding or following the pre-process circuit, wherein the feedback path includes a selector circuit, connected to the format conversion circuit and the pre-process circuit, for selecting one of the original data and the format converted data and providing the selected data to the pre-process circuit.

19. An image recorder for recording input image data provided from an imaging device and displaying an image on a display device based on the image data, the image recorder comprising:
a pre-process circuit for transferring input image data provided from the imaging device to a buffer memory and detecting control information from the input image data;
an image processing circuit for receiving the input image data from the buffer memory, performing image processing on the input image data, and generating processed image data;
an image output circuit for outputting output data to display an image on the display device based on the processed image data;
a format conversion circuit for converting a format of the output data and generating format converted data having a format that is the same as that of the input image data, the format conversion circuit outputting the output data without converting the format of the output data in case where the format of the output data is the same as that of the input image data; and
a selector circuit for receiving the input image data and either the format converted data or the output data having the same format as the in put image data, selecting one of the input image data, the format converted data and the output data having the same format as the input image data, and providing the selected data to the pre-process circuit.

* * * * *